(12) United States Patent
Moreno et al.

(10) Patent No.: US 8,315,157 B2
(45) Date of Patent: Nov. 20, 2012

(54) GRACEFUL REMOVAL AND/OR INSERTION OF A NETWORK ELEMENT

(75) Inventors: Victor M. Moreno, Carlsbad, CA (US); Mark Berly, Pittsboro, NC (US); Douglas Gourlay, San Jose, CA (US); Tameen Khan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 12/167,182

(22) Filed: Jul. 2, 2008

(65) Prior Publication Data
US 2010/0002577 A1 Jan. 7, 2010

(51) Int. Cl.
H04L 12/28 (2006.01)
(52) U.S. Cl. ........ 370/221; 370/220; 370/217; 370/227; 370/256; 370/216
(58) Field of Classification Search .................. 370/217, 370/216, 220, 221, 218, 219, 256
See application file for complete search history.

(56) References Cited

U.S. PATENT DOCUMENTS

| | | | |
|---|---|---|---|
| 7,355,983 B2 * | 4/2008 | Scudder et al. | 370/242 |
| 7,417,947 B1 * | 8/2008 | Marques et al. | 370/220 |
| 7,535,826 B1 * | 5/2009 | Cole et al. | 370/218 |
| 7,583,590 B2 * | 9/2009 | Sivakumar et al. | 370/217 |
| 7,697,437 B2 * | 4/2010 | Shin et al. | 370/238 |
| 2003/0140167 A1* | 7/2003 | Harvey et al. | 709/238 |
| 2005/0135233 A1* | 6/2005 | May | 370/216 |
| 2006/0013125 A1* | 1/2006 | Vasseur et al. | 370/217 |
| 2006/0056411 A1* | 3/2006 | Badat et al. | 370/392 |
| 2006/0080417 A1* | 4/2006 | Boutboul et al. | 709/220 |
| 2007/0159988 A1* | 7/2007 | Khan et al. | 370/256 |
| 2008/0031239 A1* | 2/2008 | Kapoor et al. | 370/389 |
| 2008/0219149 A1* | 9/2008 | Yoo | 370/217 |

OTHER PUBLICATIONS

FHRP—SSO Aware HSRP, Cisco Systems, 2005 available on the web at http://www.cisco.com/en/US/docs/ios/12_2s/feature/guide/fshsrpss.pdf.
GLBP—Gateway Load Balancing Protocol, Cisco 2008 pp. 1-5 available on the web at http://www.cisco.com/en/US/docs/ios/12_2t/12_2t15/feature/guide/ft_glbp.pdf.
Hot Standby Router Protocol Features and Functionality, Cisco 2006 available on the web at http://www.ciscosystems.org.ro/application/pdf/paws/9234/hsrpguidetoc.pdf.
Understanding Rapid Spanning Tree Protocol (802.1w), Cisco 2006 available on the web at http://www.ciscosystems.ro/application/pdf/paws/24062/146.pdf.

* cited by examiner

Primary Examiner — Ricky Ngo
Assistant Examiner — Rasheed Gidado
(74) Attorney, Agent, or Firm — Charles E. Krueger

(57) ABSTRACT

In one embodiment, when a network element is to be removed from or inserted into a network a Graceful Operations Manager schedules graceful shut-down and/or start-up routines for different protocols and/or components on the network element in an optimal order based on dependencies between the different protocols and components. The Graceful Operations Manager communicates with the different components at different stages of their shut-down or start-up process and communicates information on the standby topology across components and/or protocols to enable the synchronization of the standby topology computation on all components and/or protocols that are affected by the removal or insertion.

17 Claims, 5 Drawing Sheets

No GIR

Device Scope GIR

Network Scope GIR

GRACEFUL REMOVAL AND/OR INSERTION OF A NETWORK ELEMENT

TECHNICAL FIELD

The present disclosure relates generally to reducing traffic loss caused by removal or insertion of a network element into a network topology.

BACKGROUND OF THE INVENTION

In Layer 3 (L3) routing protocols such as, for example, Internal Gateway Protocols (IGPs) and External Gateway Protocols (EGPs), routers share network topology information with other routers in a network utilizing routing update messages that are sent when a topology change is detected. In the steady state the routing tables in all of the routers of the network are consistent. The time required to share information between all routers in a network and bring the route tables to a consistent state is called the convergence time.

These protocols are resilient in the sense that if there is topology change in the network then the network can re-converge to a new steady state. The time required to reach a new network convergence is called the re-convergence time. For networks having redundant paths between all nodes, the removal of a node will cause the network to re-converge to a state where traffic previously forwarded through the removed node will be forwarded utilizing alternate routes. During the re-convergence time the packets that were to have been forwarded through the removed node are dropped.

Resiliency is also a property of some Layer 2 (L2) protocols such as the Spanning Tree Protocol (STP) and some first hop protocols such as the Hot Standby Router Protocol (HSRP) and the Gateway Load Balancing Protocol (GLBP).

There are also dependencies between different protocols running on a network device. Thus, a delay in the reconvergence of one protocol can cause delays in the reconvergence of its dependant protocols. Furthermore, bringing down protocols in a specific order can impact the amount of time required for an overall reconvergence of all protocols running on the device.

DESCRIPTION OF EXAMPLE EMBODIMENTS

Overview

Figure 1:
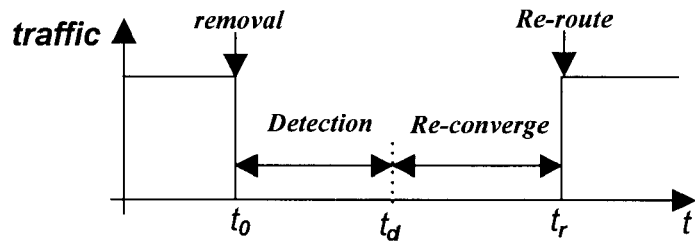
FIG. 1 illustrates an example of the duration of packet dropping when a network element is removed from the network.

In one example embodiment messages are sent from a first network element, coupled to other device in a network, to the other network elements in the network when the first network element is to be removed from or inserted into the network. A standby network topology is created to be enforced when the first network element is removed from or inserted into the network.

A sequence of start-up and/or shut-down routines are scheduled to be completed prior to enforcing the standby network topology to reduce the impact of removal or insertion. The existing network topology continues to be enforced while the standby topology is being created and the standby network topology is enforced after the sequence of start-up and/or shut-down routines is completed.

The sequence of start-up and/or shut-down routines is defined in a logical manner based on dependencies between the protocols. A logical sequence will minimize the required reconvergence time as well as the disruption to traffic forwarding.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase "an example embodiment" at various places in the specification does not necessarily refer to the same example embodiment.

Current removal and insertion mechanisms for network elements may not follow an optimal sequence of events and are based on passive detection of the removal/insertion event. The lack of a structured shut-down (or start-up) sequence, as well as the reactive nature of network resiliency protocols, results in transient packet loss during an insertion or removal operation. In the following the term "removal" will refer to both the physical removal of a network element from the network and the shut-down of a network element that remains physically connected to the network. For example, a device may be shut-down to perform upgrades or repairs and the effect on the network is the same as if the device had been physically removed.

Example embodiments that make it possible to remove or insert a network element following a structured sequence of events which minimizes network disruption will now be described. In certain scenarios, insertion/removal events are signaled proactively (rather than detected reactively) to the network resiliency protocols. This allows for further reduction of transient packet loss. Some of the scenarios allowing proactive signaling and protocol influencing include: planned removal of a device, system reloads, operator initiated removal of an element such as an interface or protocol instance, removal initiated by anomaly detection services in the platforms, etc.

In an example embodiment, a Graceful Operations Manager orchestrates the Graceful Insertion or Removal process. The Graceful Operations Manager schedules graceful shut-down or start-up routines (depending on whether the device is to be removed or inserted into the network) for different protocols and/or components on the network element in an optimal order based on dependencies between the different protocols and/or components. The Graceful Operations Manager communicates with the different components at different stages of their shut-down or start-up process and communicates information on standby topologies across components and/or protocols to enable the synchronization of the standby topology computation on all components and/or protocols that are affected by the removal or insertion of the network element.

Thus, the Graceful Operations Manager orchestrates the overall removal or insertion of the network element by calling the appropriate Graceful Shut-down or start-up routines on different processes and/or protocols in an optimal sequence in order to reduce the impact of the removal or insertion.

As will be described more fully below, in an example embodiment the Graceful Operations Manager coordinates proactive re-convergence of L3 or L2 resiliency protocols with a graceful shut-down sequence for the processes and objects associated with the network element being removed.

FIG. 1 illustrates that, for a standard network, the time period over which packets are dropped is divided into two time periods. The first time period is the detection time defined as the time from the actual removal of the node until the time the neighboring nodes have detected the removal of the device. This detection can occur, for example, if a timer expires and no periodically sent keep alive message has been received from the removed node. Subsequent to detection, alternate routes are calculated during the second time period and the re-convergence of the network takes place. Finally, when the network has re-converged the newly calculated routes are enforced and traffic previously routed through the missing node is re-routed using the redundant pathways.

Figure 2:
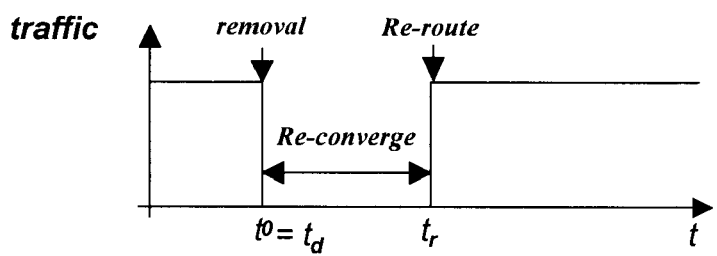
FIG. 2 illustrates an example of the duration of packet dropping when an example embodiment is implemented.

FIG. 2 illustrates that the time over which packets are dropped can be reduced by eliminating the detection time by actively notifying connected network elements of the pending insertion or removal of the node.

An example of graceful removal of a network element when an L2 Rapid Scanning Tree Protocol (RSTP) defined by the IEEE 802.1 w specification is utilized will now be described. The RSTP is an enhancement of the original Spanning Tree Algorithm (STP) defined by the IEEE 202.1D specification. The STP assures a loop-free topology in any bridged Local Area Network (LAN). Network bridges periodically send Bridge Protocol Data Units (BPDUs) to exchange information about bridge IDs and root path costs. The default period for sending BPDUs is two seconds, so as a worst case the detecting phase described with reference to FIG. 1 could be two seconds. The ports of a bridge may be in different states including a blocked state and a forwarding state. Ports in the blocked state are blocked by the STP from forwarding traffic in order to prevent the formation of a loop. Ports in the forwarding state forward traffic to devices connected to the port.

The operation of this embodiment will now be described with reference to FIG. 3 and the flow charts of FIGS. 4A and B.

A mechanism is described for the parallel and non-disruptive computation of an alternate Spanning Tree topology. The parallel and non-disruptive computation of an alternate topology allows a significant reduction in the spanning tree re-convergence time for those cases in which a root device is gracefully removed by an operator or when a root device simply fails.

In the state existing immediately prior to the removal of the network element, there are two valid STP topologies calculated. One is the active topology used for forwarding and includes the device scheduled for removal, the second is a standby topology calculated assuming the device is removed and is which not enforced until the device is indeed removed.

There are first and second sets of BPDUs in the network as well as first and second STP databases at every network element in the network. The first set of BPDUs and first STP database are used for the standard active STP topology. The second set of BPDUs and second STP Database are devoted to the alternate standby STP topology. These topologies and their associated components are referred to as "active" and "standby" respectively throughout the following description.

The presently described example embodiment is an extension of Rapid STP and is primarily useful for the removal or failure of a root device as other failures or removals re-converge quickly enough that they may not merit the added computation.

This example embodiment adds first and second new TLV (Type/Length/Value) fields to the trailing TLVs of the BPDU defined in the RSTP protocol. The first TLV added is used to convey a sequence number and the second TLV is used to flag a BPDU as a "standby" BPDU (a BPDU relevant to the standby STP topology).

As described above, the example embodiment includes a dual database structure which includes the existing "active" STP database as well as a "standby" topology database (relevant to the Standby STP topology). The databases contain the information on port roles and port state for each port in the device.

The RSTP specification defines a port role and port state for each port. The port roles are determined locally based on the BPDUs received and change immediately upon BPDU reception. The possible RSTP port roles are: Root, Designated, Alternate and Backup.

Any given port has an "active" and a "standby" port role, these are stored in the active and standby databases respectively. Port roles are representative of the topology, yet are not sufficient to define the forwarding state of a port. It is the port state that ultimately indicates if a port will forward or block traffic.

A port state is programmed in hardware based on the port roles of the local device and the connected neighbors. Before a port state can be programmed onto the hardware, a handshake must take place among the neighbors to decide into which state the port should be programmed according to the port roles on the local device and its neighbor. Possible RSTP port states are: Disabled, Blocking, Learning and Forwarding.

In the currently described example of a graceful shut-down scheme, standby port roles are calculated in parallel based on standby BPDUs and stored in the standby database. The newly calculated standby port state is not programmed into hardware until the standby port roles are fully converged.

The newly calculated standby port states are not programmed until the Graceful Operations Manager explicitly signals the RSTP component that it is permissible to program the hardware with the standby topology. This allows the Graceful Operations Manager to synchronize the RSTP graceful shut-down with the graceful shut-down of other peer protocols and/or components that may be operating on the same device.

Classic examples of components that would need synchronization are presented by those protocols usually running in the Campus/Data Center Distribution/Aggregation layer where the device serves as both the STP root and the default gateway to the local segments. Thus the graceful shut-down of the STP, Layer 3 Routing Protocol and First Hop Resiliency Protocols running on the devices must be coordinated by the Graceful Operations Manager. The two-step graceful shut-down process for STP allows this synchronization to occur.

Figure 4A:
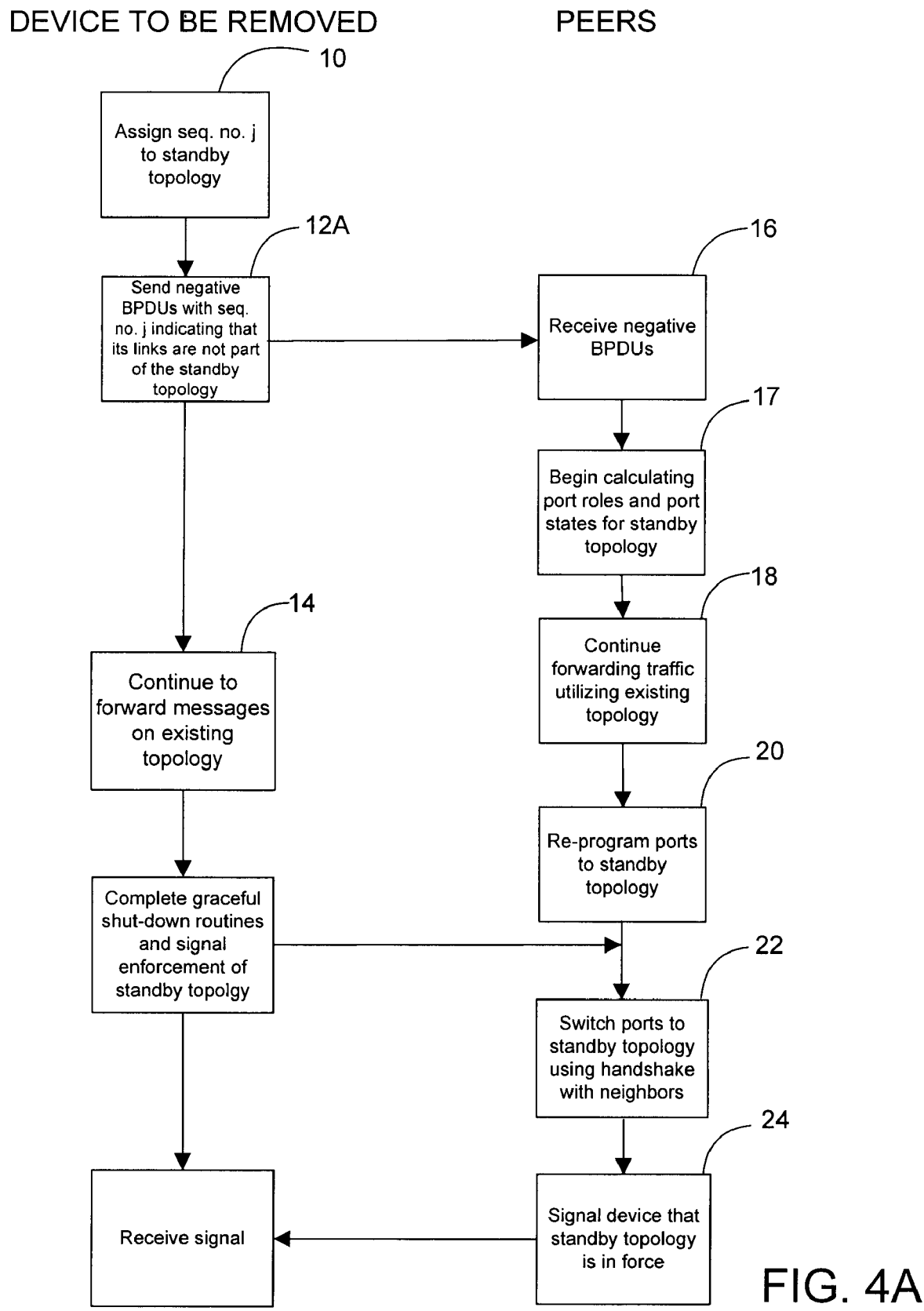
FIGS. 4A and 4B are flow charts depicting the operation of an example embodiment.
Figure 4B:
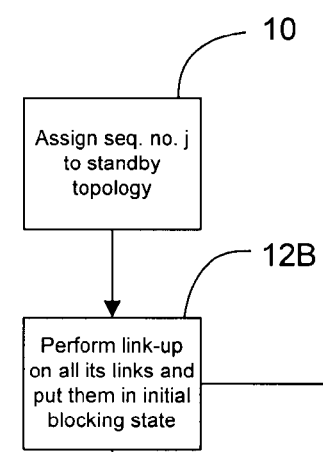
Figure 4B:
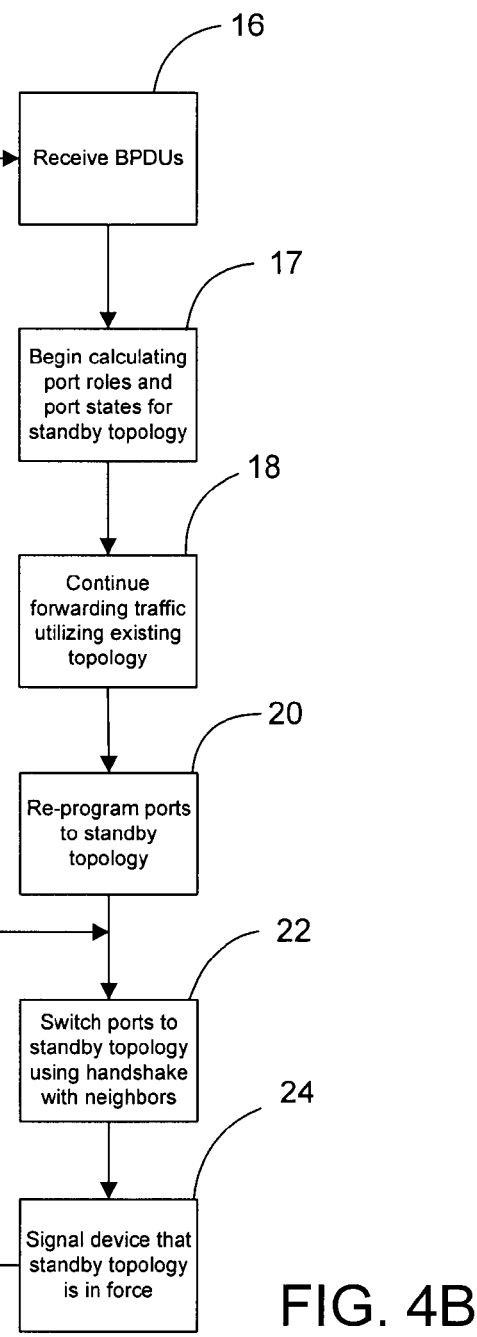

The steps of this process will now be described with reference to the flow charts of FIG. 4A (Device being removed) and FIG. 4B (Device being inserted)

Phase 1—Creation of Standby Topology
1. The Graceful Operations Manager on the network element being removed/inserted, initiates creation of a standby topology 10 with a new sequence number j (the Graceful Operations Manager must make sure this sequence number is higher than any sequence number seen before on the network).
2. A. A network element being removed starts sending "negative BPDUS" on all its links 12A with sequence number j, indicating to STP on the peer that these links will not be part of the standby topology j and continues to forward traffic 14 on the existing topology. OR B. A network element being inserted does a link up on all its links and puts them in an initial Blocking State 12B. It starts sending BPDUs with sequence number j on all these links indicating that they will be part of the new standby topology j.
3. A device to be removed continues to forward messages on the existing topology 14.

The sequence number inserted into the BPDUs indicates that the BPDUs are establishing a standby topology that will supersede the existing topology when the standby topology is enforced. Thus, all BPDUs defining a particular standby topology will have the same sequence number. The standby topology defined by BPDUs having the largest sequence number will be enforced.

Phase 2—Standby Topology Convergence
1. Each peer network element receives BPDUs 16 and computes the port roles and expected port states on the standby topology 17 in a distributed fashion. However, at this time the port states of the standby topology are not applied. (Also, since the port states are not being applied, the Proposal Agreement mechanism of RSTP is not used or needed, to rapidly make the ports forwarding). All peers continue to forward traffic utilizing the existing topology until the standby topology is enforced 18.
2. Each network element (including the one being removed) identifies the difference in the active and standby port states. Based on this, it has a set of ports which need to be made Blocking (called pending-Block) and a set of ports which need to be made Forwarding (called pending-Forward). Either or both of these sets can be empty.
3. If during this time, a higher sequence number k of standby topology BPDUs is seen by a device, it also starts using k and re-starts from step 1 of Phase 2 with this higher sequence number k.

At this stage the standby topology is converged, yet not applied. This event can be notified to the Graceful Operations Manager, along with topology information that is useful in initiating parallel convergence of other protocols that may need to synchronize with the STP state (for example HSRP or VRRP (Virtual Router Redundancy Protocol) and routing protocols at the L2/L3 boundary).

Phase 3—Active to Standby Topology Switchover (Enforcement)
1. After allowing the standby topology to converge, the enforcement of the alternate/standby topology is initiated. This is done by initiating the re-programming of the port states on all ports 20 identified as candidates (pending-Block and pending-Forward) in step 2 of Phase 2. The re-programming can either be started immediately or it could be contingent on the Graceful Operations Manager granting permission to do so (this allows the Graceful Operations Manager to synchronize the STP operations with other protocols). Re-programming can be initiated in one the following ways.
2. A. Device being removed/inserted notifies the new root to start reprogramming the port states. OR B. Each device uses a timer to allow for roles to stabilize on the standby topology before initiating the reprogramming of the port states.
3. Switching of the port states from active to standby 22 will be done with a handshake between neighbors, starting at the standby topology root as with the regular rapid-STP (RSTP) proposal agreement. This is done to ensure there are no transient loops when the topology is being switched over. Nodes closest to the root should not change any of their state unless all branches and leaves underneath have switched their state. When switching its state, a device should first apply the state of pending-Block ports followed immediately by the state of pending-Forward ports (or it can apply both states simultaneously in one atomic operation if it is possible to do so). Once the Root switches its state, the entire process has been completed and this can be signaled 24 to the Graceful Operations Manager.

A second example embodiment will now be described for use in L3 protocols such IGPs and EGPs. In this embodiment a Graceful Insertion or Removal (GIR) technique allows proactive re-convergence of L3 protocols having resiliency.

As described above, in case of an unplanned removal (such as failures) detection of a removed element is done passively based on the expiry of protocol timers.

In a first example embodiment, when a network element is purposely removed from the network, the element being removed actively signals its removal rather than wait for the neighboring elements to passively detect the removal. Along with the active signaling of the removal it may be possible to influence values transmitted in the different protocols in order to accelerate the calculation of an alternate route.

For example, when the device being removed forces a route recalculation upon its neighbors by sending update messages for its routes with unreachable metrics, traffic is only lost during the recalculation. There is no loss of traffic during detection as the event is signaled in advance instead of letting the protocol detect it.

Thus, as depicted in FIG. 2, in the first example embodiment the detection time is not included in the time duration over which packets are lost since the network is not required to passively wait until a protocol timer expires to detect the removal of the device. So for this embodiment packets are dropped only during the re-convergence time.

Figure 5:
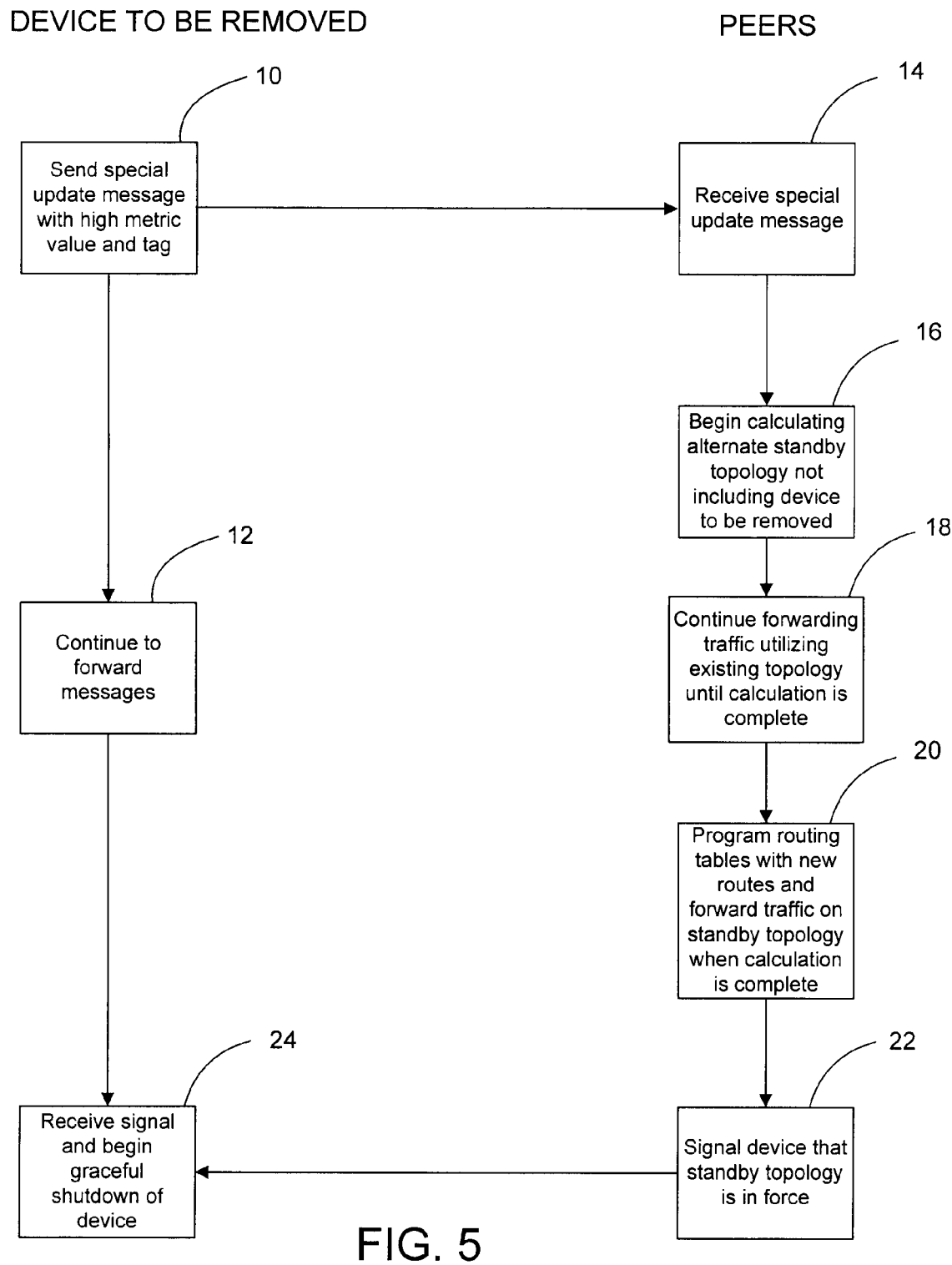
FIG. 5 is a flow chart depicting the operation of another example embodiment.

A second example embodiment will now be described with reference to FIG. 3 and the flow chart of FIG. 5 that eliminates the detection time and also allows the network to continue forwarding traffic while the network is calculating alternate routes.

This can be accomplished by sending updates with a high metric and with a tag 10 from the device to be removed. It is to be noted that in this embodiment the device to be removed is still functional. Therefore packets can continue to be forwarded 12 utilizing the old topology while the network re-converges to a new topology where the device to be removed is not present in the network.

Thus, the objective of the tag is to cause the network to continue forwarding traffic over the original path during the topology recalculation. By tagging the routes as "route_in_transition", the element scheduled for removal tells its neighbors to start calculating alternate routes 16, but not to enforce (program the forwarding table) these routes 18 until the calculation of an alternative is completed.

Once the calculation of the alternate routes is completed, the new routes are enforced (programmed into the forwarding table) 20 and completion of computation is signaled back to the element being removed 22 (a timer could also be used in lieu of this signaling). Once computation completion is signaled (or the timer expires) the network element being removed initiates a graceful shut-down sequence 24.

Figure 3:
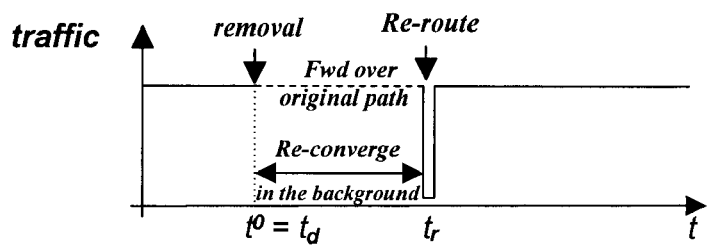
FIG. 3 illustrates an example of the duration of packet dropping when another example embodiment is implemented.

As depicted in FIG. 3, in addition to eliminating the detection time, in this embodiment traffic continues to be forwarded during the re-convergence time because the network is re-converging in the background while traffic continues to be forwarded through the device to be removed. Traffic is lost only during the short re-routing time when the newly calculated alternate routes are programmed into the forwarding tables to enforce the new routes.

Figure 6:
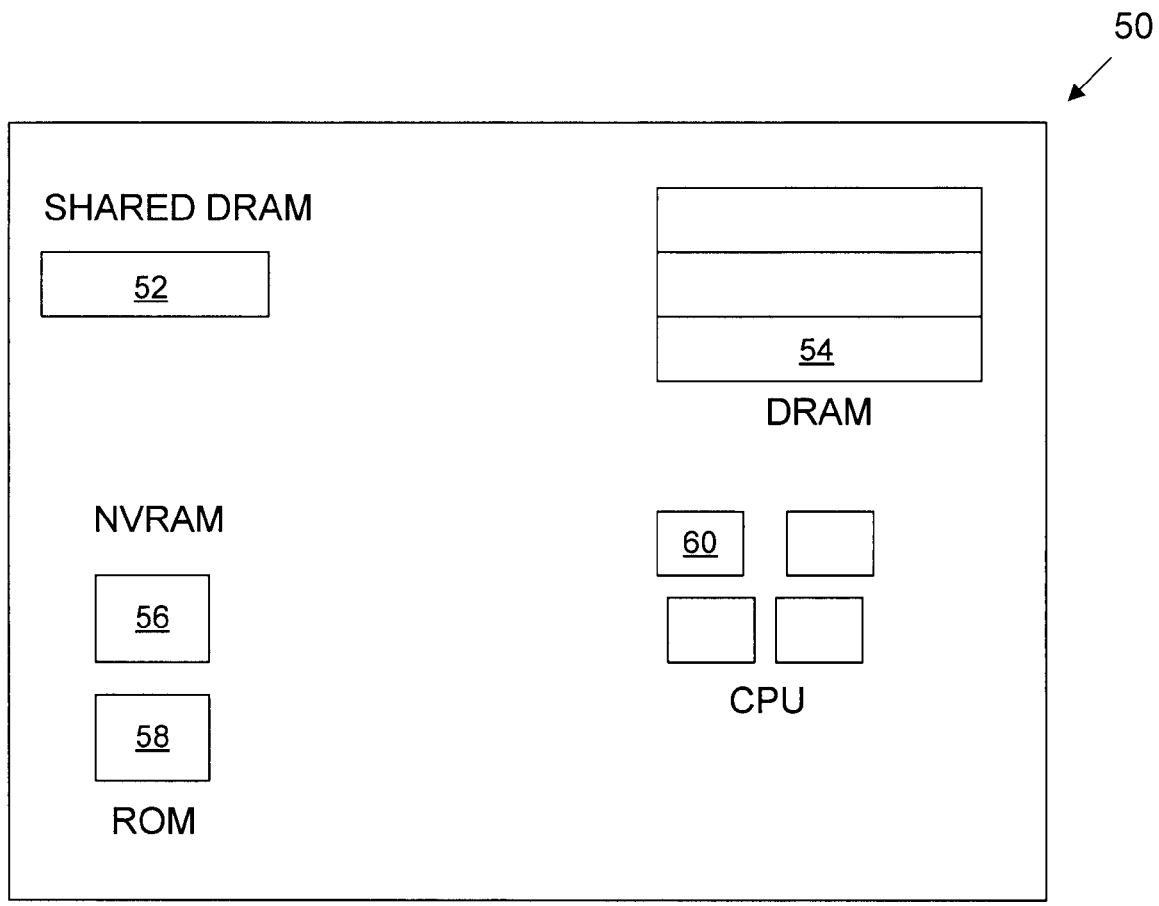
FIG. 6 illustrates an example of a network element capable of implementing an example embodiment.

FIG. 6 depicts an example of a network element including a motherboard 50 having shared DRAM 52, DRAM 54, NVRAM 56, ROM 58 and a CPU 60. (Other components on the motherboard not relevant to the present description are not depicted). The DRAM 54 is the working storage utilized by the CPU and the shared DRAM 52 is dedicated to handling the network element's packet buffer. The NVRAM (non-volatile RAM) is used to store the network element's configuration file and also includes flash memory for storing an image of the operating system. The ROM 58 holds a boot-start program which holds a minimum configuration state needed to start the network element. Alternatively, other configurations of the motherboard can be used. For example, the motherboard may not have separate ROM or NVRAM and the configuration file and operating system image may be stored and executed out of flash memory.

The invention has now been described with reference to the example embodiments. Alternatives and substitutions will now be apparent to persons of skill in the art. For example, an example embodiment utilizing RSTP has been described but other versions of STP can be utilized. Further, the TLVs described are only examples of implementing standby BPDUs. One alternative would be use only the sequence number to indicate standby BPDUs and to not include the flag. Accordingly, it is not intended to limit the invention except as provided by the appended claims.

What is claimed is:

1. A method comprising:
   receiving and processing, using a processor at a first network element included in a network having an existing network topology, alternate network topology calculating information sent from a second network element that is to be removed from or inserted into the network;
   determining, prior to removal or insertion of the second network element and using the processor at the first network element, a standby network topology from the alternate network topology calculating information received and processed at the first network element, where the standby network topology, having the second network element removed or inserted, is to be enforced when the second network element is removed from or inserted into the network and where the alternate network topology calculating information comprises a high metric indicating that the second network element is not reachable by existing routes from the other network elements, where the network has an existing topology including the first network element and a tag signaling the first network element to start calculating alternate routes defining a standby network topology not including the second network element but to continue forwarding packets on the existing network topology while calculating the standby topology;
   continuing to enforce the existing network topology and to send messages on the existing network topology, using the processor at the first network element, while the standby network topology is being determined so that the standby network topology is determined in a parallel and non-disruptive manner prior to removal or insertion of the second network element; and
   enforcing the standby network topology and sending messages on the standby network topology, using the processor at the first network element, after receipt of a notification from the second network element that the second network element is being removed from or inserted into the network.

2. The method of claim 1 where enforcing the standby network topology comprises:
   using the processor at the first network element, to calculate alternate routes after a sequence of shut-down routines is completed at the second network element.

3. The method of claim 1 where the first network element executes a layer 2 spanning tree protocol to assure a loop-free topology and where the alternate network topology calculating information further comprises:
   a standby bridge protocol data unit (BPDU) including a first sequence number indicating that the BPDU is used to define the standby network topology.

4. The method of claim 3 where the second network element is to be removed and with the standby BPDU indicating that all ports on the second network element will not be part of the standby network topology.

5. The method of claim 3 where the second network element is to be inserted into the network and with
   the standby BPDU indicating that all ports on the second network element will be part of the standby network topology.

6. One or more non-transitory computer-readable storage media with an executable program stored thereon, wherein the program instructs a processor in a first network element in a network having an existing network topology to perform the following steps:
   receiving and processing alternate network topology calculating information sent from a second network element that is to be removed from or inserted into the network, with the alternate network topology information including a high metric indicating that the second network element is not reachable by existing routes from the other network elements and where the alternate network topology calculating information further includes a tag;
   determining, prior to the removal or insertion of the second network element, a standby network topology from the alternate network topology calculating information received and processed at the first network element by calculating, in response to the tag and high metric, alternate routes defining a standby network topology not including the second network element, where the standby network topology, having the second network element removed or inserted, is to be enforced when the second network element is removed from or inserted into the network;
   continuing to forward packets on the existing network topology and to enforce the existing network topology and to send messages on the existing network topology while the standby network topology is being determined so that the standby network topology is determined in a parallel and non-disruptive manner prior to removal or insertion of the second network element; and enforcing the standby network topology and sending messages on the standby network topology after receipt of a notification from the second network element that the second network element is being removed from or inserted into the network.

7. The one or more non-transitory computer readable storage media of claim 6 wherein the executable program stored thereon further instructs the processor to perform the following steps:

enforcing the standby network topology after a sequence of shut-down routines is completed at the second network element.

8. The one or more non-transitory computer readable storage media of claim 6 where the first network element executes a layer 2 spanning tree protocol to assure a loop-free topology, wherein the executable program stored thereon further instructs the processor to perform the following steps:

receiving and processing a standby bridge protocol data unit (BPDU) including a first sequence number indicating that the BPDU is used to define the standby network topology.

9. The one or more non-transitory computer readable storage media of claim 8 where the second network element is to be removed from the network and wherein the executable program stored thereon further instructs the processor to perform the following steps:

receiving and processing the standby BPDU indicating that all ports on the second network element will not be part of the standby network topology.

10. The one or more non-transitory computer readable storage media of claim 8 where the second network element is to be inserted into the network and wherein the executable program stored thereon further instructs the processor to perform the following steps:

receiving and processing the standby BPDU indicating that all ports on the second network element will be part of the standby network topology.

11. An apparatus comprising:

a memory storing graceful removal/insertion program code and data included in a first network element which is part of a network having an existing network topology;

a processor included in the first network element, coupled to said memory, and configured to execute the graceful removal/insertion program code to receive and process alternate network topology calculating information sent from a second network element, when the second network element is to be removed from or inserted into the network, with the alternate network topology information including a high metric indicating that the second network element is not reachable by existing routes from the other network elements and where the alternate network topology calculating information further includes a tag, configured to determine, prior to removal or insertion of the second network element and using the alternate network topology calculating information, a standby network topology to be enforced when the second network element is removed from or inserted into the network by calculating, in response to the tag and high metric, alternate routes defining a standby network topology not including the second network element, configured to continue to forward packets on the existing network topology and to enforce the existing network topology and to send messages on the existing network topology while the standby topology is being determined so that the standby network topology is determined in a parallel and non-disruptive manner prior to removal or insertion of the second network element and configured to enforce the standby network topology after a sequence of start-up and/or shut-down routines is completed at the second network element.

12. The apparatus of claim 11 with the processor further configured to execute graceful removal/insertion code to:

enforce the standby network topology after calculating alternate routes and the sequence of shut-down routines is completed at the second network device.

13. The apparatus of claim 11 with the processor further configured to execute graceful removal/insertion code to:

execute a layer 2 spanning tree protocol to assure a loop-free topology and receive and process a standby bridge protocol data unit (BPDU) including a first sequence number indicating that the BPDU is used to define a standby topology.

14. The apparatus of claim 13 where the second network element is to be removed from the network and with the processor further configured to execute graceful removal/insertion code to:

receive and process the standby BPDU indicating that all ports on the second network element which is to be removed will not be part of the standby topology.

15. The apparatus of claim 13 where the second network element is to be inserted into the network and with the processor further configured to execute graceful removal/insertion code to:

receive and process the standby BPDU indicating that all ports on the second network element that is to be inserted will be part of the standby topology.

16. The apparatus of claim 13 with the processor further configured to execute graceful removal/insertion code to:

enforce the standby network topology after a timer expires.

17. The apparatus of claim 13 with the processor further configured to execute graceful removal/insertion code to:

enforce the standby network topology when a message is received from the second network element.

\* \* \* \* \*